US012739045B2

(12) United States Patent
Srinivas et al.

(10) Patent No.: US 12,739,045 B2
(45) Date of Patent: Sep. 15, 2026

(54) METHOD AND A SYSTEM FOR CREATING MULTI-PORT NETWORK SYNCHRONIZATION BRIDGE

(71) Applicant: COREEL TECHNOLOGIES INDIA PRIVATE LIMITED, Bengaluru (IN)

(72) Inventors: Dasari Durga Satya Srinivas, Bengaluru (IN); Sachin Vaish, Bengaluru (IN)

(73) Assignee: COREEL TECHNOLOGIES INDIA PRIVATE LIMITED (IN)

( * ) Notice: Subject to any disclaimer, the term of this patent is extended or adjusted under 35 U.S.C. 154(b) by 12 days.

(21) Appl. No.: 18/713,172

(22) PCT Filed: Sep. 6, 2023

(86) PCT No.: PCT/IN2023/050838
§ 371 (c)(1),
(2) Date: May 23, 2024

(87) PCT Pub. No.: WO2024/069643
PCT Pub. Date: Apr. 4, 2024

(65) Prior Publication Data

US 2025/0226904 A1 Jul. 10, 2025

(30) Foreign Application Priority Data

Sep. 28, 2022 (IN) ............................. 202241055548

(51) Int. Cl.
*H04J 3/06* (2006.01)
*H04L 67/52* (2022.01)
*H04L 69/14* (2022.01)

(52) U.S. Cl.
CPC .......... *H04J 3/0667* (2013.01); *H04J 3/0641* (2013.01)

(58) Field of Classification Search
CPC ...... H04J 3/0667; H04J 3/0661; H04J 3/0658; H04J 3/0641; H04L 69/14; H04L 67/52; G06F 13/40
See application file for complete search history.

(56) References Cited

U.S. PATENT DOCUMENTS 8,630,315 B2 1/2014 Rivaud et al.
11,088,816 B1 * 8/2021 Sarda .................... H04J 3/0697
(Continued)

FOREIGN PATENT DOCUMENTS

CA 3078834 A1 * 4/2019 ............... H04L 7/00
CN 102299788 A * 12/2011 ........... H04J 3/0697
(Continued)

OTHER PUBLICATIONS

Dong et al., "The Design and Implementation of IEEE 1588v2 Clock Synchronization System by Generating Hardware Time-stamps in MAC Layer," IEEE 2018. (Year: 2018).*
(Continued)

*Primary Examiner* — Alina A Boutah

(57) ABSTRACT

Invention relates to a method and a system (200) for creating multi-port network synchronization bridge between ethernet ports and a processor via programmable Gate Array (PGA). The method comprises segregating (102), by PGA, a Precision Time Protocol (PTP) message associated with each ethernet port among ethernet ports into one of a critical or a non-critical message. The method comprises determining (104), by processor and PGA, based on PTP message one ethernet port as a Slave port and one or more ethernet ports as one or more Master ports. The method comprises processing (106), by PGA, critical message by determining, based on segregation of critical message, whether difference between master clock and system clock, exceeds predefined threshold; and compensating, difference between them based on determination within predefined range. The
(Continued)

method comprises processing (108), by processor, non-critical message based on plurality of Transmit (Tx) and Receive (Rx) pulses generated by PGA.

20 Claims, 7 Drawing Sheets

(56) References Cited

U.S. PATENT DOCUMENTS

| | | | | |
|---|---|---|---|---|
| 11,899,491 | B1 * | 2/2024 | Sherman | G06F 15/7867 |
| 2011/0200051 | A1 * | 8/2011 | Rivaud | H04L 12/413<br>370/503 |
| 2011/0286497 | A1 * | 11/2011 | Nervig | H04L 25/03159<br>375/147 |
| 2016/0170440 | A1 * | 6/2016 | Aweya | G06F 1/10<br>713/503 |
| 2019/0116021 | A1 * | 4/2019 | Tanwar | H04J 3/0673 |
| 2019/0349392 | A1 * | 11/2019 | Wetterwald | H04L 43/0852 |
| 2023/0060679 | A1 * | 3/2023 | Pustylnik | H04L 7/0008 |
| 2023/0379075 | A1 * | 11/2023 | Thyni | H04J 3/0667 |

FOREIGN PATENT DOCUMENTS

| | | | | |
|---|---|---|---|---|
| CN | 105846941 | A * | 8/2016 | H04J 3/0667 |
| CN | 110995388 | A * | 4/2020 | H04J 3/0682 |
| CN | 113890662 | A * | 1/2022 | H04J 3/0667 |
| CN | 114268400 | A * | 4/2022 | |
| CN | 114401067 | A * | 4/2022 | H04J 3/0658 |
| CN | 115580389 | B * | 12/2024 | H04J 3/0661 |
| WO | 2021061261 | A1 | 4/2021 | |

OTHER PUBLICATIONS

Meier et al., "IEEE 1588 Syntonization and Synchronization Functions Completely Realized in Hardware," ISPCS 2008—International IEEE Symposium on Precision Clock Synchronization for Measurement, Control and Communication Ann Arbor, Michigan, Sep. 22-26, 2008 (Year: 2008).*

Kyriakakis et al., "Hardware Assisted Clock Synchronization with the IEEE 1588-2008 Precision Time Protocol," © 2018 Copyright held by the owner/author(s). Publication rights licensed to ACM. ACM ISBN 978-1-4503-6463-8/18/10. https://doi.org/10.1145/3273905.3273920 (Year: 2018).*

IEEE Standards Association: "IEEE Standard for a Precision Clock Synchronization Protocol for Networked Measurement and Control Systems," IEEE Instrumentation and Measurement Society, Developed by Technical Committee on Sensor Technology (TC-9), IEEE Std 1588-2019 (Revision of IEEE Std 1588-2008). (Year: 2019).*

Precision Time Protocol (PTP/IEEE-1588). Endrun Technologies. (2022, Jan. 20). https://endruntechnologies.com/pdf/PTP-1588.pdf.

Han, M., Wang, Z., & Liu, Q. (n.d.). IEEE 1588 Time Synchronisation and data flow assessment for IEC 61850 based power transmission substations (thesis). IEEE 1588 time synchronisation and data flow assessment for IEC 61850 based power transmission substations.

International Search Report and Written Opinion as issued in connection with International Patent Application PCT/IN2023/050838 mailed Oct. 1, 2024, 10 pages.

India First examination as issued in connection with India Application 202241055548 mailed Nov. 16, 2022, 8 pages.

India Hearing Notice as issued in connection with India Application 202241055548 mailed Mar. 13, 2023, 3 pages.

* cited by examiner

100 segregating, by the PGA, a Precision Time Protocol (PTP) message associated with each ethernet port among the plurality of ethernet ports into one of: a critical message comprising at least one of a Sync message and a Sync Follow-up message, and a non-critical message comprising at least one of an Announce message, a delay Request message and a delay Response message

102 determining, by the processor and the PGA, based on the PTP message one ethernet port as a Slave port and one or more ethernet ports as one or more Master ports

104 processing, by the PGA, the critical message by determining, based on segregation of the critical message, whether a difference between a master clock and a system clock, exceeds a predefined threshold, and compensating, the difference between the master clock and the system clock based on the determination within a predefined range

106 processing, by the processor, the non-critical message based on a plurality of Transmit (Tx) pulses and a plurality of Receive (Rx) pulses generated by the PGA.

METHOD AND A SYSTEM FOR CREATING MULTI-PORT NETWORK SYNCHRONIZATION BRIDGE

FIELD OF THE INVENTION

The present disclosure relates to a method of creating multi-port network synchronization bridge between a plurality of ethernet ports and a processor via a programmable Gate Array (PGA), and a system thereof.

BACKGROUND

Studies reveal that due to advancements in computer networks, time synchronization has become a critical parameter to be taken care of. The reason behind this is that for almost all operations such as controlling, securing, scheduling, debugging, etc., a network needs to determine the occurrence of events. Further, time offers a frame of reference between all devices connected within the network. Without time synchronization, correlating log files accurately between these devices is not only difficult but impossible as well. Similarly, for real-time communication with non-negotiable time boundaries, all devices in the synchronized network need to have a common time reference and therefore, need to synchronize their clocks with each other. For example, the occurrence of events, their order of occurrence, the way of the collection of data and logging of data, etc., depends mostly on the synchronization of devices in a network. Therefore, for effective network management, clock synchronization on all network devices is always needed. This may not only be true for the end devices of a communication stream, such as an industrial controller and a manufacturing robot but also true for network components, such as Ethernet bridges/switches.

Only through clock synchronization, it is possible for all network devices to operate together and execute the required operations exactly at the required point in time. One way to achieve clock synchronization is using Global Positioning System (GPS). However, even though time synchronization can be achieved with GPS, this is expensive and there is no assurance that the endpoint has access to the satellite signal. Hence, the synchronization of devices in the network is difficult to achieve depending upon GPS.

Therefore, timing in a synchronized network is generally distributed from one central time source directly through the network using the Precision Time Protocol (PTP), which uses Ethernet frames to distribute time synchronization information. Unlike high-end network processors, achieving precise time synchronization for multiple port Bridges on cost-optimized platform is a big challenge.

Thus, there is a need for a solution that overcomes the above deficiencies.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

The present disclosure puts forward a unique and efficient hybrid Precision Time Protocol (PTP) implementation scheme for multi-port bridge on cost effective platform. The disclosure renders a cost effective and resource optimized solution, with a combination of low-cost processor and low-cost Programmable Gate Array (PGA) or Application Specific Integrated Circuit (ASIC), that may be virtuously scalable up to multiple Ethernet ports. The hybrid (Hardware and Software) implementation of the multi-port bridge results in an efficient, flexible and cost effective, in achieving the precise time synchronization.

In an embodiment, a method of creating multi-port network synchronization bridge between a plurality of ethernet ports and a processor via a programmable Gate Array (PGA) is disclosed. The method comprises segregating, by the PGA, a PTP message associated with each ethernet port among the plurality of ethernet ports into one of a critical message comprising at least one of a Sync message and a Sync Follow-up message, and a non-critical message comprising at least one of an Announce message, a delay Request message and a delay Response message. The method further comprises determining, by the processor and the PGA, based on the PTP message one ethernet port as a Slave port and one or more ethernet ports as one or more Master ports. The method further comprises processing, by the PGA, the critical message by determining, based on segregation of the critical message, whether a difference between a master clock and a system clock, exceeds a predefined threshold, and compensating, the difference between the master clock and the system clock based on the determination within a predefined range. The method further comprises processing, by the processor, the non-critical message based on a plurality of Transmit (Tx) pulses and a plurality of Receive (Rx) pulses generated by the PGA.

In another embodiment, a system for creating multi-port network synchronization bridge between a plurality of ethernet ports and a processor via a programmable Gate Array (PGA), is disclosed. The system comprises the PGA configured to segregate a Precision Time Protocol (PTP) message associated with each ethernet port among the plurality of ethernet ports into one of a critical message comprising at least one of a Sync message and a Sync Follow-up message, and a non-critical message comprising at least one of an Announce message, a delay Request message and a delay Response message. The PGA is further configured to process the critical message by determining, based on segregation of the critical message, whether a difference between a master clock and a system clock, exceeds a predefined threshold; and compensating, the difference between the master clock and the system clock based on the determination within a predefined range of precision. Furthermore, the processor is configured to process the non-critical message based on a plurality of Transmit (Tx) pulses and a plurality of Receive (Rx) pulses generated by the PGA. The processor and the PGA, are adapted to determine, based on the PTP message one ethernet port to be assigned as a Slave port and one or more ethernet ports to be assigned as one or more Master ports.

To further clarify advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 1 illustrates a flow chart depicting a method of creating multi-port network synchronization bridge between a plurality of ethernet ports and a processor via a programmable Gate Array (PGA), according to an embodiment of the present invention;

Figure 2A:
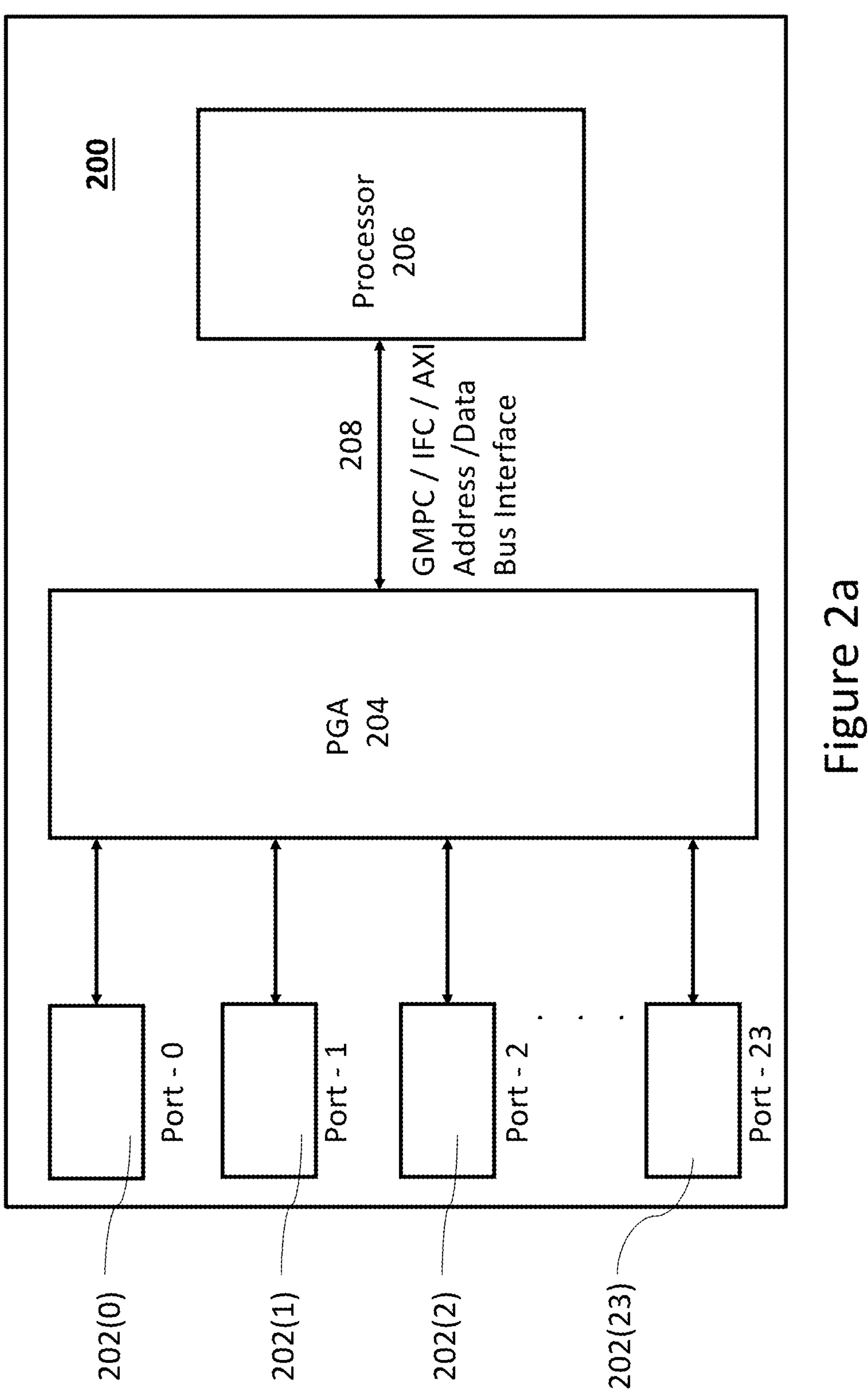
FIG. 2*a* illustrates a block diagram of a system for creating multi-port network synchronization bridge between a plurality of ethernet ports and a processor via a programmable Gate Array (PGA)

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION OF FIGURES

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the present invention. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the present invention will be described below in detail with reference to the accompanying drawings.

Figure 1:
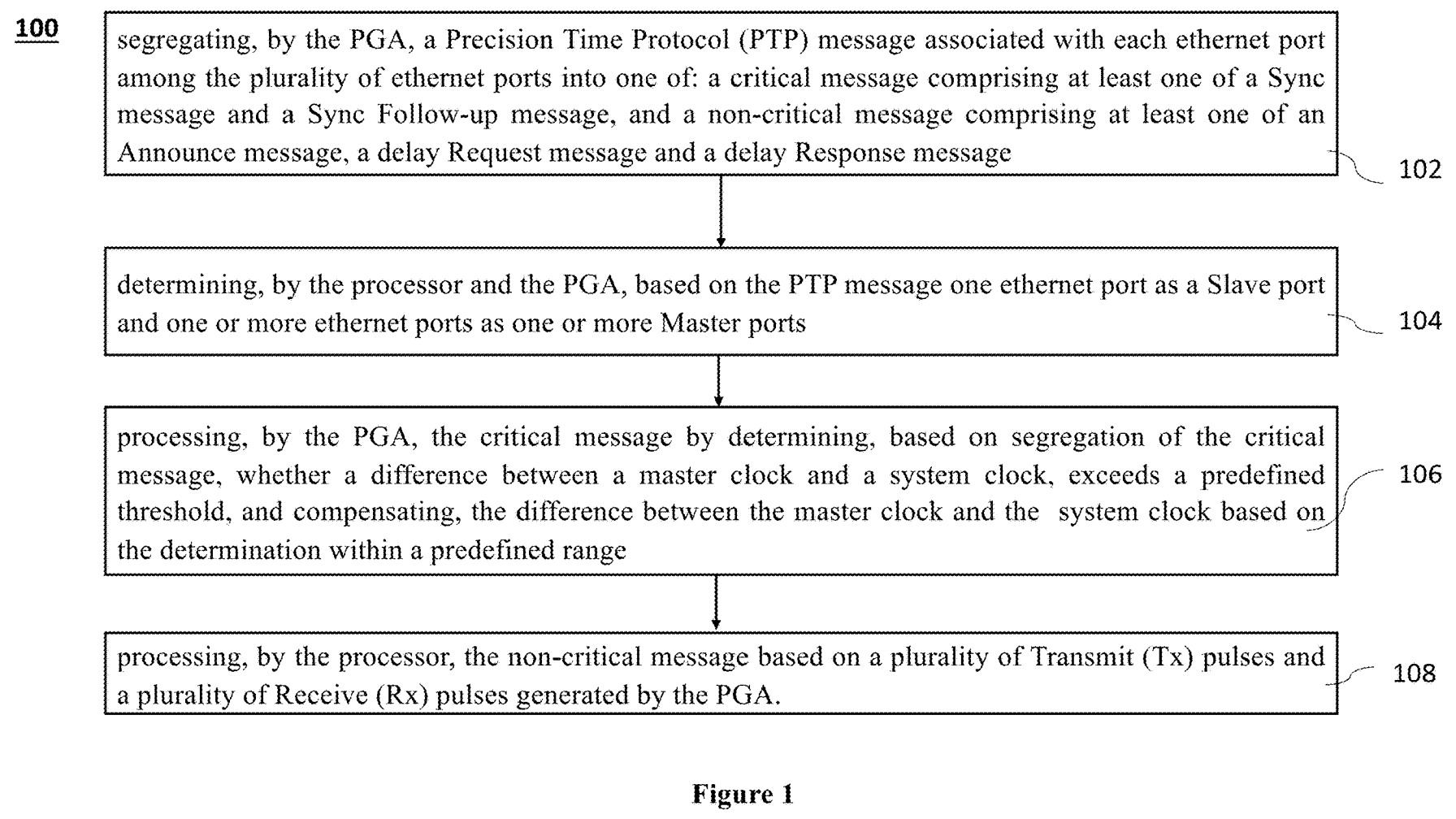
Figure 2B:
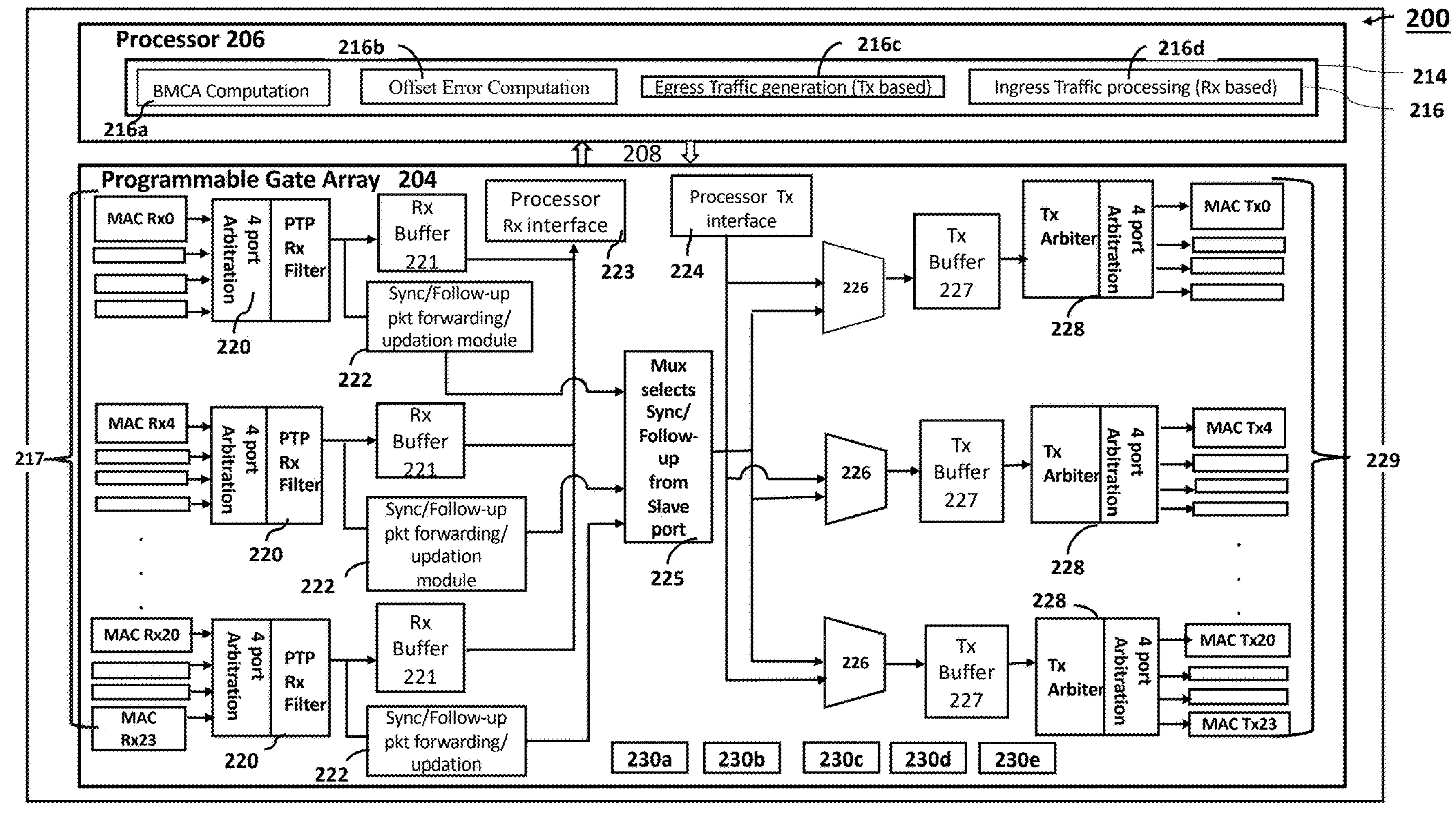
FIG. 2*b* illustrates an exploded view of the system with a 24-Port Hybrid Precision time Protocol (PTP) Bridge, according to an embodiment of the present invention.

FIG. 1 illustrates a flow chart depicting a method 100 for creating multi-port network synchronization bridge between a plurality of ethernet ports and a processor via a programmable Gate Array (PGA), according to an embodiment of the present invention. FIG. 2*a* illustrates a block diagram of a system 200 for creating multi-port network synchronization bridge between a plurality of ethernet ports 202(0)-202(23) and a processor 206 via a programmable Gate Array (PGA) 204, according to an embodiment of the present invention. FIG. 2*b* depicts an exploded view of the system 200 with a 24-Port hybrid Precision time Protocol (PTP) Bridge, according to an embodiment of the present invention. For the sake of brevity, the description of the FIGS. 1, 2*a* and 2*b*, are explained in conjunction with each other.

As depicted through FIG. 2*a*, the data packets may be received by the system 200 at the plurality of ethernet ports 202(0)-202(23), which are forwarded directly to the PGA 204, where after being processed, the data packets may be forwarded to the processor 206 via Data Bus 208.

The system 200 as referred in FIGS. 2*a* and 2*b* may include, but is not limited to, the plurality of ethernet ports, the PGA 204, the processor 206 and a Data Bus or an Address bus 208. In an example embodiment of the present invention, the plurality of ethernet ports may be as many as 24 ethernet ports 202(0)-202(23), which are directly coupled to the PGA 204. The PGA 204 is adapted to generate a plurality of Transmit (Tx) pulses and a plurality of Receive (Rx) pulses. The PGA 204 is further communicably coupled with the processor 206 via a Data Bus or an Address Bus 208.

In an example, the PGA 204 may be a Programmable Gate Array (PGA) or an Application Specific Integrated Circuit (ASIC). The PGA 204, as depicted in FIG. 2*b*, include a Media Access Control (MAC) Receive (Rx) ports 217, plurality of PTP Receive (Rx) filters 220, a plurality of Rx buffers 221, a plurality of Sync/Follow-up pkt forwarding/updation modules 222, a processor Rx interface 223 to enable the processor 206 to read all the PGA's 204 Rx Buffers 221, a processor Tx interface 224, a multiplexer 225, a plurality of multiplexers 226, a plurality of Tx Buffers 227, a plurality of Tx arbiters 228, a Tx/Rx packet time stamping module 230*a*, a Tx/Rx pulse generation module 230*b*, an Announce packet processing module 230*c*, a system clock calibration module 230*d*, a Control & Status register (CSR) Block 230*e*, and a plurality of Media Access Control (MAC) Transmit (Tx) ports 229, etc.

FIG. 2*b* depicts the system 200, in which the Data packets received at the plurality of ethernet ports 202(0)-202(23) are forwarded directly to the PGA 204. To optimize the hardware resources, at least four ethernet ports are grouped together, for example, 202(0)-202(3), 202(4)-202(7) . . . 202(20)-202(23) and arbitrated in both transmit and receive directions. For example, the Media Access Control (MAC) Receive (Rx) ports 217 receive the data packets from these grouped ethernet ports. For every 4 Ethernet ports, one Tx Buffer 227 is assigned. Tx arbiter 228 reads the messages/packets from the Tx Buffer 227 and transmits them on the respective ports. The received data packets at the Rx ports 217 are forwarded to the PTP Rx filter 220 of the PGA 204, where these packets are checked for a Precision Time Protocol (PTP) message or packet type, as being the critical message type or a non-critical message type. All the PTP messages are timestamped using a local system clock running in a hardware. The critical messages like the Sync/Sync Follow-up are allowed to be handled by the RTL logic of the PGA 204, and non-critical messages like Announce/Pdelay Request/Pdelay response(s) are forwarded to the processor 206 through the Rx Buffer 221. On receiving the non-critical messages, the BMCA Computation module 216*a* of the processor 206 computes the Best Master based on the clock parameters received from all the ethernet ports 202(0)-202(23). This BMCA Computation module 216*a* works in conjunction with RTL Announce packet processing module 230*c* of the PGA 204, to efficiently derive the Master port in a network and assign various port states as Master or Slave, etc. Similarly, the offset error computation module 216*b* of the processor 206 computes the offset error between the Master clock and the local system clock. This error offset is averaged across multiple samples before calibrating the local system clock. Further, the egress traffic generation module 216*c* of the processor 206 generates a non-critical periodic traffic based on a Tx interrupt signal generated by the RTL logic. The processor 206 also includes the ingress traffic processing module 216*d* that processes the non-critical ingress traffic, based on an Rx interrupt signal generated by the RTL logic. The non-critical periodic PTP messages are generated by the processor 206 and written to the Tx Buffer 227, which may be read out and transmitted by the RTL logic. Prior to this, the multiplexer 225 is adapted select Sync/follow-up from the slave port, and the plurality of multiplexers 226 are adapted to receive signals from the processor Tx interface 224 and the multiplexer 225. After being written to the Tx Buffer 227, the PTP messages are forwarded to the MAC Tx ports 229.

In an aspect of the present invention, the CSR Block 230*e* is responsible for co-ordination between a register transfer level (RTL) of the PGA 204 and a User Application running on the processor 206. The application gets all the ingress and egress messages timestamp through this module. A PTP user application may have read and write access to a CSR bank associated with the CSR block 230*e*.

In an example embodiment, as depicted in FIG. 2*b*, the plurality of ethernet ports 202(0)-202(23) are directly connected to the plurality of Media Access Control (MAC) Receive (Rx) ports 217 of the PGA 204. The invention eliminates the requirement of connecting these ethernet ports 202(0)-202(23) to processor 206. Instead, the PGA 204 and the processor 206 are connected via Address Bus or Data Bus 208.

In an example, the Data Bus 208 may include a General Purpose Memory Controller (GPMC), an Advanced extensible Interface (AXI) or an Integrated Flash Controller (IFC) bus.

In an example, the processor 206 includes an operating system 214, which further includes a user application 216. The user application 216 further includes a BMCA computation module 216*a*, an offset error computation module 216*b*, a Tx based egress traffic generation module 216*c* and Rx based ingress traffic processing module 216*d*.

It should be noted that the system 200 may be a part of an electronic device. In another embodiment, the system 200 may be connected to an electronic device. It should be noted that the term "electronic device" refers to any electronic devices used by a user such as a mobile device, a desktop, a laptop, personal digital assistant (PDA) or similar devices.

Referring to FIG. 1, at step 102, the method 100 may include segregating a Precision Time Protocol (PTP) message associated with each ethernet port among the plurality of ethernet ports 202(0)-202(23). For example, the PGA 204 may segregate the PTP message associated with each ethernet port. The (PTP) message may be segregated into one of a critical message and a non-critical message. The critical message includes at least one of a Sync message and a Sync Follow-up message. Similarly, the non-critical message may include at least one of an Announce message, a delay Request message and a delay Response message.

In an aspect of the present invention, the incoming PTP messages are filtered, time stamped and categorized into critical and non-critical messages. The critical messages like the Sync/Sync Follow-up are handled by the RTL logic, and non-critical messages like Announce/Pdelay Request/Pdelay Response are forwarded to the processor 206 through the Rx Buffer 221. Non-critical periodic PTP messages are generated by the processor 206 and written to the Tx Buffer 227, which may be read out and transmitted by the RTL logic.

In an aspect of the present invention, the Tx/Rx packet time stamping module 230*a* is responsible for timestamping all the ingress and egress PTP messages. Based on the Rx filter 220 output, all the PTP messages are timestamped using a local system clock running in a hardware. The received timestamp of all the PTP messages may be appended to PTP message and forwarded for further processing.

At step 104 of the method 100, based on the PTP message, it is determined, by the processor 206 and the PGA 204, one ethernet port among the plurality of ethernet ports 202(0)-202(23) to act as a Slave port and remaining ethernet ports among the plurality of ethernet ports 202(0)-202(23) to act as one or more Master ports. However, if in case, the bridge receives Announce message from the same Master, on two different Ethernet ports among the plurality of ethernet ports 202(0)-202(23), one port may be assigned as the Slave port and other may be assigned as a Passive port.

In an aspect of the present invention, the processor 206 and the PGA 204 may determine that one of ethernet port 202(0)-202(23) to act as the Slave port and one or more ethernet ports 202(0)-202(23) to act as one or more Master ports based on superiority or inferiority of the clock parameters of each port 202(0)-202(23). The superiority or inferiority of the clock parameters is decided based on receipt of an announce message at least at one of the plurality of ethernet ports 202(0)-202(23). The processor 206 may extract the one or more clock parameters from the Announce message.

In an aspect of the present invention, the Announce packet processing module 230*c* handles all PTP Announce messages. It monitors for any changes in the clock parameters, and forwards to the processor 206 in case of any parameters update. The received Announce message is discarded if a Source Port Identity of the message matches with a Local Port Identity, or if Steps removed exceeds 255, that is if the value of the "Steps removed" parameter in standard PTP header exceeds 255, then the particular Announce packet may be discarded. Based on the processed result, the current port status may be updated to either the Master port or the Slave port or the Passive port.

In an example embodiment, the bridge may act as the Slave on one of the ethernet ports 202(0)-202(23) and the Master on the rest of the ports 202(0)-202(23). The port state may be determined based on the clock parameters announced by neighbouring devices. The port with best clock parameters may be chosen as the Master, using Best Master Clock Algorithm (BMCA) or similar other algorithm.

At step 106 of the method 100, based on segregation of the critical message (at step 102), the critical message may be processed, by the PGA 204, by determining, whether a difference between a master clock and a system clock, exceeds a predefined threshold. The PGA 204 is further adapted to compensates the difference between the master clock and the system clock based on the determination within a predefined range.

In an aspect of the present invention, the incoming PTP messages are filtered, time stamped and categorized into critical and non-critical messages. The critical messages like the Sync/Sync Follow-up are handled by RTL logic, and non-critical messages like Announce/Pdelay Request/Pdelay Response are forwarded to processor 206 through Rx Buffer 221. Non-critical periodic PTP messages are generated by the processor 206 and written to Tx Buffer 227, which may be read out and transmitted by the RTL logic.

In an example embodiment, the system clock, which may be interchangeably referred as the local system clock, may be fully implemented using RTL logic. On reception of the Sync/Follow-up message, the offset from the Master port may be calculated. Based on an offset value, an increment value for the system clock may be derived. In case the difference between the system clock and offset value is more than the configured threshold, the hardware logic may evenly compensate the difference in sub-nano seconds precision. Since the complete implementation is on hardware, the clock synchronization may be highly accurate and smooth.

In an aspect of the present invention, the System Clock Calibration Module 230*d* runs the local system clock. The coarse and fine calibration of the clock happens based on Sync and Sync follow-up messages from the Master. When the Sync or Follow-up message is received on the slave port, the RTL logic forwards both these messages to all other Master ports. While forwarding Follow-up packet to other Master ports, it updates the time-stamp field. Upon reception of Sync and Sync follow-up packets from the Master, the application may calculate the offset from the Master. This process is termed herein as a coarse correction. The same procedure may be followed for first 16 Sync follow-up packets. Thereafter, the error between the Master and the Slave is taken as usual and updated. Since instant updating of the error may result in direct jump in the System Clock, such an offset may be divided over 25 clocks, i.e., every 25 clock periods, 0.1 ns may be added to the System Clock. The same procedure may be continued until the error is completely corrected. This process is termed herein as a fine correction.

The local system clock consists of 3 parameters.

| Sl. No | Parameter | Precision |
|---|---|---|
| 1 | Seconds | 32 Bits |
| 2 | Nano-seconds | 32 Bts |
| 3 | Sub Nano-seconds | 22 Bits |

In an example embodiment of the present invention, the PTP traffic on the processor 206 may be completely handled at User Application Layer 216, without using a package or libraries or drivers. This provides the flexibility for porting the PTP user application on any processor family like ARM, Power-PC, etc. At step 108 of the method 100, based on the plurality of Tx pulses and the plurality of Rx pulses generated by the PGA 204, the processor 206 processes the non-critical message.

In an embodiment of the present invention, prior to the processing (at step 108) the non-critical message, the method 100 includes a step of transmitting the non-critical message from the PGA 204 to the processor 206 through one or more Data Bus 208.

In an aspect of the present invention, processing (at step 108), by the processor 206, the non-critical message includes processing the non-critical message without using a driver or libraries or a package.

In an embodiment of the present invention, the method 100 further includes a step of determining, by the processor 206, a best master clock (BMC) based on the one or more clock parameters. The method further includes a step of determining if the announce message is received at least at one of the plurality of ethernet ports 202(0)-202(23). The method 100 further includes a step of determining by the PGA 204 if there is variation in one or more clock parameters associated with the at least one of the plurality of ethernet ports. If the variation in one or more clock parameters associated with the at least one of the plurality of ethernet ports 202(0)-202(23) is confirmed by the PGA 204 based on determination, the announce message is copied to a Receive (Rx) buffer 221 of the PGA 204.

In an embodiment of the present invention, the method 100 further includes a step of determining, by the PGA 204, if the Sync message or Sync Follow-up message is received at least at one of the plurality of ethernet ports 202(0)-202(23). If the determining confirms the receipt of the Sync message or Sync Follow-up message at least at one of the plurality of ethernet ports 202(0)-202(23), the PGA 204 copies the received Sync message or Sync Follow-up message to the transmit (Tx) buffer 227.

In an embodiment of the present invention, the method 100 further includes a step of determining, by the PGA 204, if a transmit (Tx) pulse signal, which is internally generated by RTL logic in PGA is further received by the processor 206. In an example embodiment, the transmit (Tx) pulse signal may be internally generated after a constant interval of time, and the constant interval of time can be, but not limited to, 125 ms. The method 100 further includes generating the non-critical periodic PTP transmit messages by the processor 206 based on the determination, based on the generation, after retrieving the PTP messages, the PGA 204 may further transmit the PTP message received from the transmit (Tx) buffer 227. In other words, the periodic and non-critical traffic can be generated and handled by the processor 206 based on Tx and Rx pulses generated by the RTL logic.

In an embodiment of the present invention, the method 100 further includes a step of determining, by the PGA 204, if a receive (Rx) pulse signal is received. Further, in response to determining if the receive (Rx) pulse signal is received, the processor 206 may retrieve the non-critical messages for the processing.

In an embodiment of the present invention, the method 100 further includes a step of determining whether the non-critical message received by the processor 206 from the PGA 204 via the Data Bus 208 is a Pdelay request message. The method 100 further includes generating a Pdelay response by the processor 206 if the Pdelay request message is received. Furthermore, the Pdelay response maybe transmitted by the processor 206 to the transmit (Tx) buffer 227. If, in case, the Pdelay response is received in the receive (Rx) buffer 221, a network path delay may be calculated by the processor 206.

In an embodiment of the present invention, if periodic transmit (Tx) pulses or interrupt pulse may be received, a plurality of periodic messages corresponding to all of the plurality of ethernet ports 202(0)-202(23) is generated by the processor 206.

In an embodiment of the present invention, a plurality of periodic messages corresponding to all of the plurality of ethernet ports 202(0)-202(23) may be generated by the processor 206, if periodic transmit (Tx) pulses or interrupt pulse is received.

In an embodiment of the present invention, a correction field of the Sync Follow-up message of the critical message may be updated by the PGA 204, based on timestamping and a processing delay computed by the PGA 204. In other words, based on the received timestamp and processing delay, the Correction field is updated by the RTL logic, before packet transmission.

Figure 3:
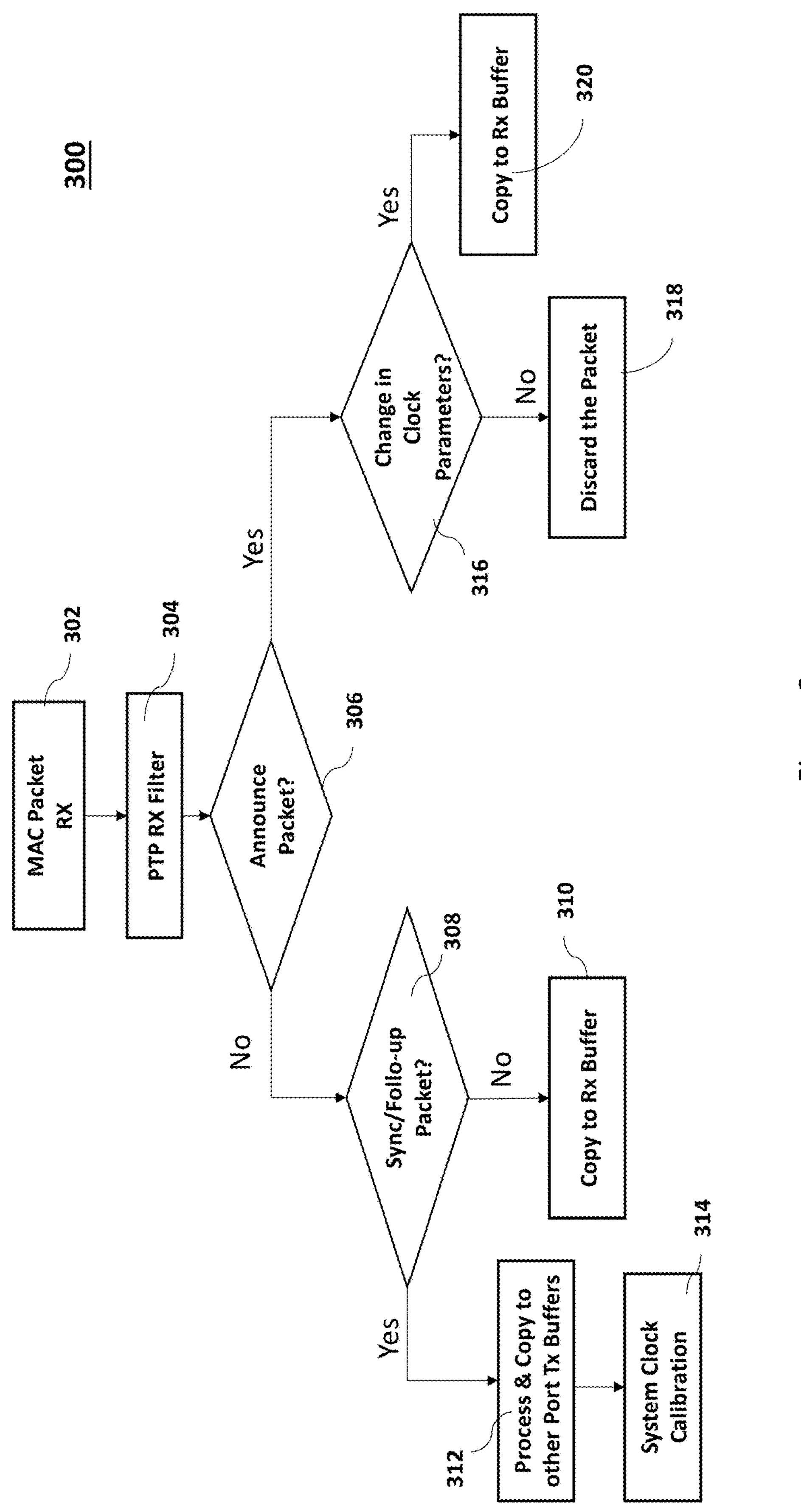
FIG. 3 illustrates a Receive (Rx) register transfer level (RTL) execution flow for ingress traffic, according to an embodiment of the present invention.

FIG. 3 depicts a Receive (Rx) register transfer level (RTL) execution flow 300 for ingress traffic, according to an embodiment of the present invention. The execution flow 300 comprises various steps as described below.

At Step 302, one or more packets are received at one or more MAC Rx 217 of the PGA 204.

At step 304, the received packets are forwarded to PTP Rx filter 220 of the PGA 204 where these packets are checked for a Precision Time Protocol (PTP) message or packet type, as being the critical message type or a non-critical message type.

At step 306, a condition is checked, whether an Announce packet is received or not.

At step 308, when the receipt of the Announce packet is not confirmed, i.e., if any other PTP packet is received, it is further checked if the Sync or Sync Follow-up packet is received or not.

At step 310, when the receipt of the Sync or Sync Follow-up packet is not confirmed, i.e., if any other PTP packet is received, it is copied to the Rx buffer 221.

At step 312, when the receipt of the Sync or Sync Follow-up packet is confirmed, it is processed and copied to all other Tx Buffers 227.

At step 314, using the processed data, the system clock is calibrated. If any other PTP packet is received, it is copied to Rx Buffer 221.

At step 316, when the receipt of announce message is confirmed, the update in clock parameters is checked.

At step 318, when the update in clock parameters is not confirmed, the packet may be discarded.

At step 320, when the update in clock parameters is confirmed, the packet is copied to the Rx buffer 221.

Figure 4:
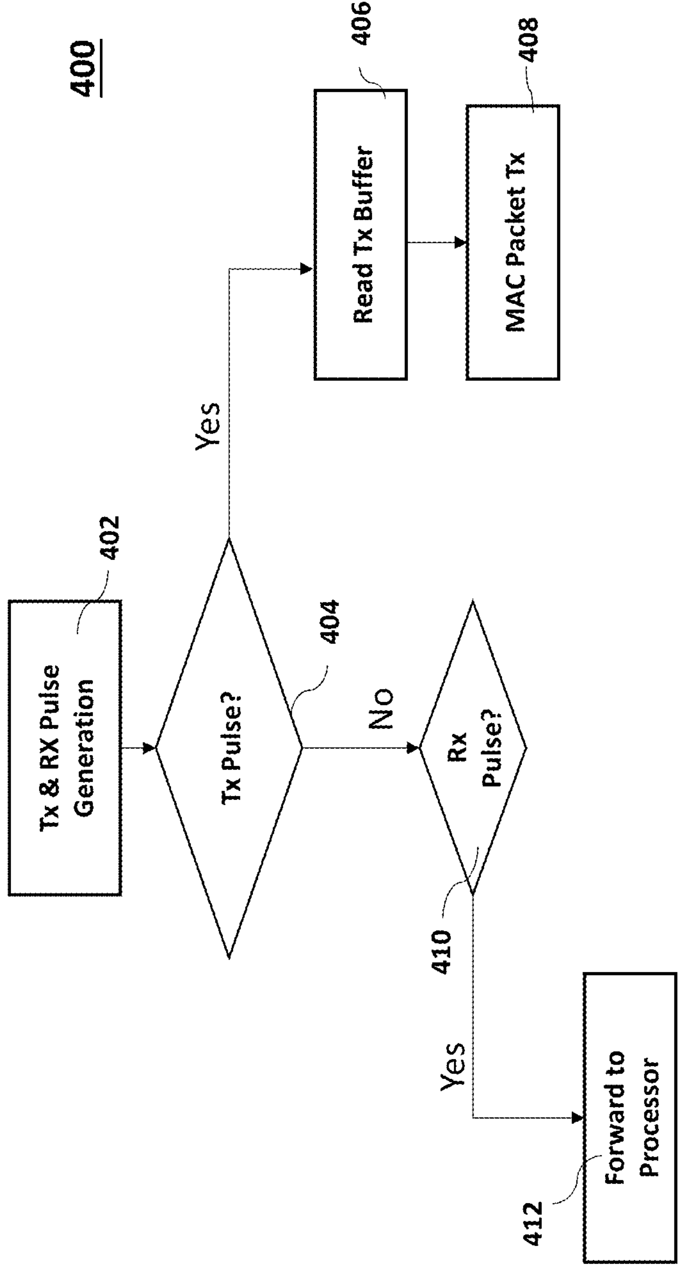
FIG. 4 illustrates a Transmit (Tx) RTL execution flow for egress traffic, according to an embodiment of the present invention.

FIG. 4 illustrates a Transmit (Tx) RTL execution flow 400 for egress traffic, according to an embodiment of the present invention. The execution flow 400 comprises various steps as described below.

At step 402, one or more Tx or Rx pulses are internally generated;

At step 404, a condition is checked whether the Tx pulse is received;

At step 406, it is confirmed that internally generated Tx pulse is received, the packets from all the port's Tx Buffers 227 are readout;

At step 408, the readout packets from all the port's Tx buffers 227 are transmitted to one or more MAC packet Tx ports 229;

At step 410, it is checked whether the internally generated Rx pulse is received; and At step 412, it is confirmed that internally generated Rx pulse is received, the RTL logic forwards this signal to processor 206 as an Rx interrupt signal.

Figure 5:
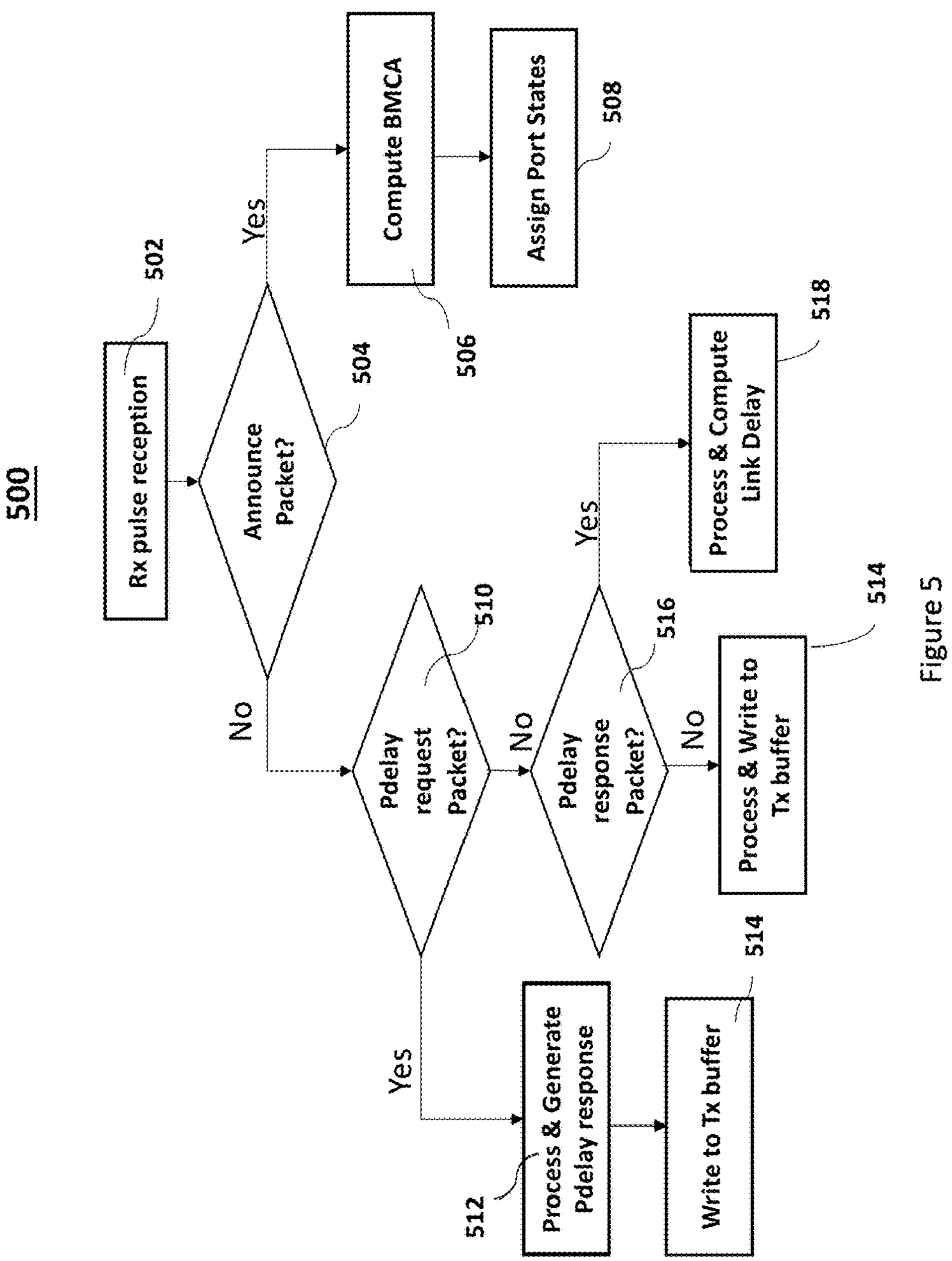
FIG. 5 illustrates an Rx processor execution flow for ingress traffic, according to an embodiment of the present invention.

FIG. 5 depicts an Rx processor execution flow 500 for ingress traffic, according to an embodiment of the present invention.

At step 502, the Rx pules is received;

At step 504, a condition is checked whether an Announce packet is received;

At 506, it is confirmed that the Announce packet is received, a best master clock is computed. The best master may be computed using Best Master Clock Algorithm (BMCA) or similar other algorithm;

At step 508, based on the computed result obtained from step 506, the respective port states (i.e., Master port or Slave port) are assigned to the ethernet port 202(0)-202(23);

At step 510, it is confirmed that the packet received is other than the Announce packet. At this step a condition is checked whether, a Pdelay Request packet is received;

At step 512, the receipt of Pdelay Request packet is confirmed, therefore, a Pdelay Response is generated and further processed;

At step 514, the generated Pdelay Response is written to Tx Buffer 227 for transmission;

At step 516, it is checked whether a Pdelay Response packet is received;

If the receipt of Pdelay Response packet is not confirmed, it is processed and written to Tx Buffer 227 for transmission (step 514); and At step 518, when the receipt of the Pdelay Response packet is confirmed, the packet is processed and network path delay is calculated or in other words, the link delays are calculated.

Figure 6:
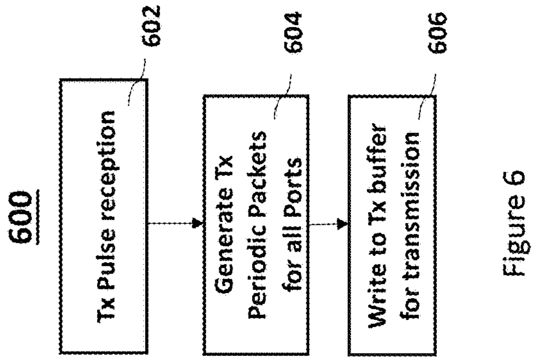
FIG. 6 illustrates a Tx processor execution flow for egress traffic, according to an embodiment of the present invention.

FIG. 6 illustrates a Tx processor execution flow 600 for egress traffic, according to an embodiment of the present invention.

At step 602, a periodic Tx pulse/interrupt is received;

At step 604, all the required periodic messages for all the ports are generated; and At step 606, the generated periodic messages for all the ports are written to Tx Buffer 227 for transmission.

Figure 7:
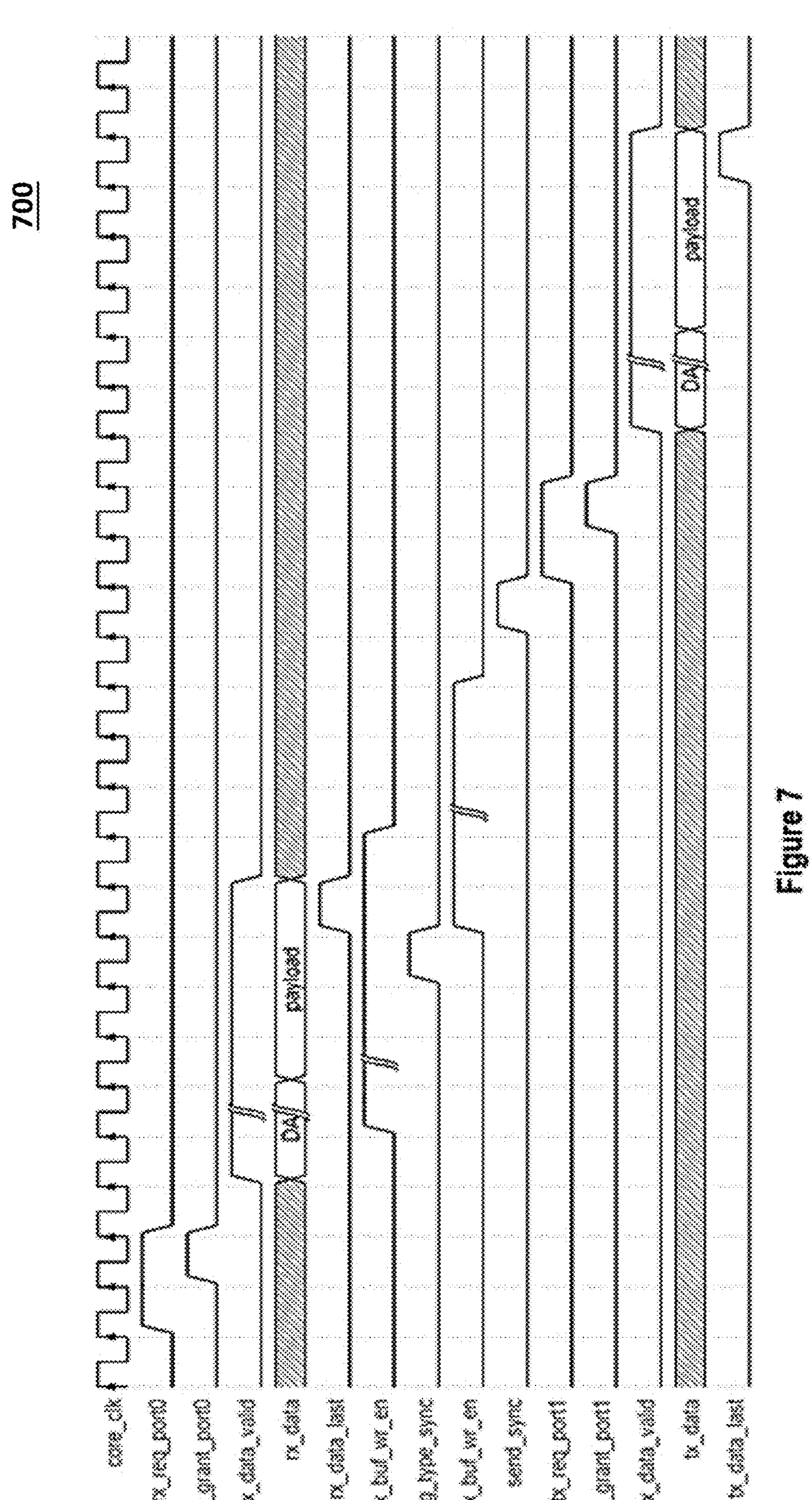
FIG. 7 illustrates an RTL timing diagram for Sync packet processing in hardware, according to an embodiment of the present invention r.

FIG. 7 depicts the RTL Timing Diagram 700 for Sync packet processing and in hardware, according to an embodiment of the present invention. The Sync packet received on the Slave port, may be processed and transmitted on all the Master ports. To optimize the hardware resources, four Ethernet ports are grouped together, for example, 202(0)-202(3), 202(4)-202(7) . . . 202(20)-202(23) and arbitrated in both transmit and receive directions. The residence/transit delay of this packet is calculated on the hardware and forwarded in the Sync Follow-up packet. Based on the architecture of the invention, the Sync packet processing latency of ~0.62 microsecond is achieved.

As may be seen, that the independent Hardware or Software specific PTP implementations for a Bridge has their own shortcomings. Hardware implementation is less flexible and consumes more PGA/ASIC resources and power. Software implementation may have accuracy, efficiency & performance/throughput related issues. So, a Hybrid implementation is proposed which shall overcome the shortcomings of independent approaches. It shall consume less PGA/ASIC resources and processor bandwidth. Apart from efficiency and accuracy, it shall also provide lot of flexibility in terms of debug ability, feature enhancements & user configurability using processor.

The processor 206 herein and above can be a single processing unit or several units, all of which could include multiple computing units. The processor 206 may be implemented as one or more microprocessors, microcomputers, microcontrollers, central processing units (CPU), graphics processing units (GPU), state machines, logic circuitries, and/or any devices that manipulate signals based on operational instructions. The processor 206 may be a component in a variety of systems. For example, the processor 206 may be part of a standard personal computer or a workstation. Among other capabilities, the processor 206 is configured to fetch and execute data stored in the memory or computer-readable instructions from application-specific integrated circuits, field-programmable gate arrays, servers, networks, digital circuits, analog circuits, combinations thereof, or other now known or later developed devices for analyzing and processing data. The processor 206 may implement a software program, such as code generated manually (i.e., programmed).

As may be seen, that as per the conventional technique, the execution of BMCA on all the ports of PTP Bridge is time consuming and also impacts the processing bandwidth. The present invention implements a hybrid and an efficient Central Best Master Clock determination procedure, which is implemented in both Hardware (RTL) and Software. The implementation helps in scanning all the ports Announce messages and derives the Master, Slave and Passive port roles. Unlike the general process of re-computing the BMCA on reception of Announce message on all the ports, the invention compares the periodic Announce message of all the ports in Hardware/RTL, for any changes in the parameters. Based on the response from Hardware, the PTP user application runs the BMCA to determine the port states.

One of ordinary skill in the art will realize that a different embodiment of the present invention can employ different types of the computing devices such as the PGA 204 and the processors 206. For example, in the embodiments described above, one of the PGA 204 can be a known Xilinx device that utilises 14000 LUTs, 23,500 FFs, 42 DSPs, and 24 BRAMs for 24-ports, operating at 200 MHz. When connected to the plurality of ethernet ports 202(0)-202(23), the PGA is capable of dynamic reconfiguring the data.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

While specific language has been used to describe the present disclosure, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method of creating multi-port network synchronization bridge between a plurality of ethernet ports and a processor via a programmable Gate Array (PGA), the method comprising:

segregating, by the PGA, a PTP message associated with each ethernet port among the plurality of ethernet ports into one of:

a critical message comprising at least one of a Sync message and a Sync Follow-up message, and a non-critical message comprising at least one of an Announce message, a delay Request message and a delay Response message;

determining, by the processor and the PGA, based on the PTP message one ethernet port as a Slave port and one or more ethernet ports as one or more Master ports;

processing, by the PGA, the critical message by:

determining, based on segregation of the critical message, whether a difference between a master clock and a system clock, exceeds a predefined threshold; and compensating, the difference between the master clock and the system clock based on the determination within a predefined range; and processing, by the processor, the non-critical message based on a plurality of Transmit (Tx) pulses and a plurality of Receive (Rx) pulses generated by the PGA.

2. The method as claimed in claim 1, wherein prior to the processing the non-critical message, the method comprising:

transmitting the non-critical message from the PGA to the processor through one or more data bus.

3. The method as claimed in claim 1, wherein processing, by the processor, the non-critical message comprises processing the non-critical message without using a driver or libraries or a package.

4. The method as claimed in claim 1, wherein the method further comprising:

determining if the announce message is received at least at one of the plurality of ethernet ports;

determining if there is variation in one or more clock parameters associated with the at least one of the plurality of ethernet ports;

copying the announce message to a Receive (Rx) buffer of the PGA on determining that there is variation in the one or more clock parameters; and determining, by the processor, a best master clock (BMC) based on the announce message stored in the Rx buffer.

5. The method as claimed in claim 1, further comprising: determining, by the PGA, if the Sync message or Sync Follow-up message is received at least at one of the plurality of ethernet ports; and copying, by the PGA, the received Sync message or Sync Follow-up message to a transmit (Tx) buffer of the PGA based on the determination.

6. The method as claimed in claim 1, further comprising: determining, by the PGA, if a transmit (Tx) pulse signal is generated periodically and received by the processor;

generating, by the processor, the non-critical periodic PTP transmit messages based on the determination, and transmitting, by the PGA, the PTP message from a transmit (Tx) buffer based on the generation, after retrieving the PTP messages.

7. The method as claimed in claim 1, further comprising: determining, by the PGA, if a receive (Rx) pulse signal is generated periodically and received by the processor;

retrieving, by the processor, the non-critical messages for the processing, based on the determination.

8. The method as claimed in claim 1, wherein the determining, by the processor and the PGA, based on the PTP message one ethernet port as the Slave port and one or more ethernet ports as one or more Master ports is based on superiority or inferiority of the clock parameters of each port if the announce message is received at least at one of the plurality of ethernet ports;

wherein the one or more clock parameters are extracted from the Announce message via the processor.

9. The method as claimed in claim 1, further comprising: determining whether the non-critical message received by the processor from the PGA via the data bus is a Pdelay request message;

generating, by the processor, a Pdelay response, if the Pdelay request message is received;

transmitting, by the processor, the Pdelay response to the transmit (Tx) buffer; and calculating, by the processor, a network path delay, if the Pdelay response is received in the receive (Rx) buffer.

10. The method as claimed in claim 1, further comprising: generating, by the processor, a plurality of periodic messages corresponding to all of the plurality of ethernet ports, if periodic transmit (Tx) pulses or interrupt pulse is received.

11. The method as claimed in claim 1, further comprising: updating, by the PGA, a correction field of the Sync Follow-up message of the critical message based on timestamping and a processing delay computed by the PGA.

12. A system for creating multi-port network synchronization bridge between a plurality of ethernet ports and a processor via a programmable Gate Array (PGA), the system comprising:

the PGA configured to:

segregate a PTP message associated with each ethernet port among the plurality of ethernet ports into one of:

a critical message comprising at least one of a Sync message and a Sync Follow-up message, and a non-critical message comprising at least one of an Announce message, a delay Request message and a delay Response message;

process the critical message by:

determining, based on segregation of the critical message, whether a difference between a Master clock and a system clock, exceeds a predefined threshold; and compensating, the difference between the Master clock and the system clock based on the determination within a predefined range of precision; and the processor is configured to:

process the non-critical message based on a plurality of Transmit (Tx) pulses and a plurality of Receive (Rx) pulses generated by the PGA;

wherein the processor and the PGA, are adapted to determine, based on the PTP message one ethernet port to be assigned as a Slave port and one or more ethernet ports to be assigned as one or more Master ports.

13. The system as claimed in claim 12, wherein prior to the processing of the non-critical message, the system is configured for transmitting the non-critical message from the PGA to the processor through one or more data bus.

14. The system as claimed in claim 12, wherein the processor is configured to process the non-critical message without using a driver or a libraries or a package.

15. The system as claimed in claim 12, wherein the processor is configured to:

determine if the announce message is received at least at one of the plurality of ethernet ports;

determine if there is variation in one or more clock parameters associated with the at least one of the plurality of ethernet ports;

copy the announce message to a Receive (Rx) buffer of the PGA on determining that there is variation in the one or more clock parameters; and determine a best master clock (BMC) based on the announce message stored in the Rx buffer.

16. The system as claimed in claim 12, the PGA is configured to:

determine if the Sync message or Sync Follow-up message is received at least at one of the plurality of ethernet ports; and copy the received Sync message or Sync Follow-up message to a Transmit (Tx) buffer of the PGA based on the determination.

17. The system as claimed in claim 12, wherein the system is configured to:

determine, by the PGA, if a transmit (Tx) pulse signal is generated periodically and received by the processor;

generate, by the processor, the non-critical periodic PTP transmit messages based on the determination, and transmit, by the PGA, the PTP message from a transmit (Tx) buffer based on the generation, after retrieving the PTP messages.

18. The system as claimed in claim 12, wherein the system is configured to:

determine, by the PGA, if a receive (Rx) pulse signal is generated periodically and received by the processor;

retrieve, by the processor, the non-critical messages for the processing, based on the determination.

19. The system as claimed in claim 12, wherein the system is configured to:

determine, by the processor and the PGA, based on the PTP message one ethernet port as the Slave port and one or more ethernet ports as one or more Master ports is based on superiority or inferiority of the clock parameters of each port if the announce message is received at least at one of the plurality of ethernet ports wherein the one or more clock parameters are extracted from the Announce message via the processor.

20. The system as claimed in claim 12, wherein the system is configured to:

determine whether the non-critical message received by the processor from the PGA via the data bus is a Pdelay request message;

generate, by the processor, a Pdelay response, if the Pdelay request message is received;

transmit, by the processor, the Pdelay response to the transmit (Tx) buffer; and calculate, by the processor, a network path delay, if the Pdelay response is received in the receive (Rx) buffer.

* * * * *